United States Patent
Krebs et al.

(10) Patent No.: US 12,260,551 B2
(45) Date of Patent: Mar. 25, 2025

(54) COMPENSATION OF ORGAN DEFORMATION FOR MEDICAL IMAGE REGISTRATION

(71) Applicant: Siemens Healthineers AG, Forchheim (DE)

(72) Inventors: Julian Krebs, Moers (DE); Sebastien Piat, Lawrence Township, NJ (US)

(73) Assignee: Siemens Healthineers AG, Forchheim (DE)

(*) Notice: Subject to any disclaimer, the term of this patent is extended or adjusted under 35 U.S.C. 154(b) by 306 days.

(21) Appl. No.: 17/755,558

(22) PCT Filed: Dec. 13, 2019

(86) PCT No.: PCT/US2019/066141
§ 371 (c)(1),
(2) Date: May 2, 2022

(87) PCT Pub. No.: WO2021/118581
PCT Pub. Date: Jun. 17, 2021

(65) Prior Publication Data
US 2022/0270256 A1    Aug. 25, 2022

(51) Int. Cl.
*G06T 7/00* (2017.01)
*G06T 7/11* (2017.01)
(Continued)

(52) U.S. Cl.
CPC ............ *G06T 7/0012* (2013.01); *G06T 7/11* (2017.01); *G06V 10/25* (2022.01); *G06V 10/761* (2022.01);
(Continued)

(58) Field of Classification Search
CPC . G06T 2207/10016; G06T 7/246; G06T 5/50; G06T 7/20; G06T 11/005;
(Continued)

(56) References Cited

U.S. PATENT DOCUMENTS 11,154,196 B2   10/2021   Zhang
2011/0085716 A1   4/2011   Chefd'Hotel et al.
(Continued)

FOREIGN PATENT DOCUMENTS

CN   109102532 B   7/2022
EP   3246875 A2   11/2017

OTHER PUBLICATIONS

Yang et al., "Quicksilver: Fast Predictive Image Registration—A Deep Learning Approach", Neuroimage, 2017, vol. 158, pp. 378-396.
(Continued)

*Primary Examiner* — Ajibola A Akinyemi

(57) ABSTRACT

Systems and methods for medical image registration are provided. A first input medical image and a second input medical image of one or more anatomical objects are received. For each respective anatomical object of the one or more anatomical objects, a region of interest comprising the respective anatomical object is detected in one of the first input medical image or the second input medical image, the region of interest is extracted from the first input medical image and from the second input medical image, and a motion distribution of the respective anatomical object is determined from one of the region of interest extracted from the first input medical image or the region of interest extracted from the second input medical image using a motion model specific to the respective anatomical object. The first input medical image and the second input medical image are registered based on the motion distribution of each respective anatomical object of the one or more anatomical objects to generate a fused image.

20 Claims, 4 Drawing Sheets

(51) Int. Cl.
*G06V 10/25* (2022.01)
*G06V 10/74* (2022.01)
*G06V 10/77* (2022.01)
*G06V 10/82* (2022.01)

(52) U.S. Cl.
CPC .......... *G06V 10/7715* (2022.01); *G06V 10/82* (2022.01); *G06T 2207/20081* (2013.01); *G06T 2207/20084* (2013.01); *G06V 2201/03* (2022.01); *G06V 2201/07* (2022.01)

(58) Field of Classification Search
CPC ..... G06T 2211/412; G06T 2207/10081; G06T 2207/20081; G06T 2207/20084; G06T 5/73; G06T 13/40; G06T 2207/20056; G06T 2207/30004; G06T 2207/30168
USPC .......................................................... 382/128
See application file for complete search history.

(56) References Cited

U.S. PATENT DOCUMENTS

| | | | |
|---|---|---|---|
| 2015/0055842 A1 | 2/2015 | Codella et al. | |
| 2015/0055942 A1 | 2/2015 | Codella et al. | |
| 2015/0065859 A1* | 3/2015 | Hwang | A61B 6/037 600/440 |
| 2017/0337682 A1 | 11/2017 | Liao et al. | |
| 2019/0205766 A1 | 7/2019 | Krebs et al. | |

OTHER PUBLICATIONS

Rohe et al., "SVF-Net: Learning Deformable Image Registration Using Shape Matching", International Conference on Medical Image Computing and Computer-Assisted Intervention, Springer, 2017, pp. 266-274.

Sokooti et al., "Nonrigid Image Registration Using Multi-scale 3D Convolutional Neural Networks", International Conference on Medical Image Computing and Computer-Assisted Intervention, Springer, 2017, pp. 232-239.

de Vos et al., "End-to-End Unsupervised Deformable Image Registration with a Convolutional Neural Network", Deep Learning in Medical Image Analysis and Multimodal Learning for Clinical Decision Support, Springer, 2017, pp. 204-212.

Dalca et al., "Unsupervised Learning for Fast Probabilistic Diffeomorphic Registration", International Conference on Medical Image Computing and Computer-Assisted Intervention, Springer, 2018, pp. 729-738.

Krebs et al., "Learning a Probabilistic Model for Diffeomorphic Registration", IEEE Transactions on Medical Imaging, 2019, pp. 1-12.

Hu et al., "Weakly-Supervised Convolutional Neural Networks for Multimodal Image Registration", Medical Image Analysis, 2018, vol. 49, pp. 1-13.

Balakrishnan et al., "VoxelMorph: a Learning Framework for Deformable Medical Image Registration", IEEE Transactions on Medical Imaging, 2019, pp. 1-13.

Krebs et al., "Probabilistic Motion Modeling from Medical Image Sequences: Application to Cardiac Cine-MRI", STACOM 2019: Statistical Atlases and Computational Models of the Heart, 2019, 10 pgs.

Xu et al., "Efficient Multi-Atlas Abdominal Segmentation on Clinically Acquired CT with SIMPLE Context Learning", Med Image Anal., 2015, vol. 24, No. 1, pp. 18-27.

Krebs et al., "Unsupervised Probabilistic Deformation Modeling for Robust Diffeomorphic Registration", Deep Learning in Medical Image Analysis and Multimodal Learning for Clinical Decision Support, 2018, pp. 101-109.

International Search Report mailed Jul. 23, 2020 in corresponding International Patent Application No. PCT/US2019/066141.

Ferrante Enzo et al.; 2018; "Weakly-Supervised Learning of Metric Aggregations for Deformable Image Registration", Arxiv.Org, Cornell University.

Shan Siyuan et al: "Unsupervised End-to-end Learning for Deformable Medical Image Registration"; URL: https://arxiv.org/pdf/1711.08608.pdf / Nov. 23, 2017.

Preiswerk Frank et al..; "Model guided respiratory organ motion prediction of the liver from 2D ultrasound"; 2014; ELSEVIER; pp. 740-751.

Ferrante, Enzo et al; "Weakly Supervised Learning of Metric Aggregations for Deformable Image Registration"; IEEE Journal of Biomedical and Health Informatics; vol. 23; No. 4.

Shan Siyuan et al; "Unsupervised End-to-end Learning for Deformable Medical Image Registration"; Nov. 23, 2017; vol. 14; No. 8; Journal of Latex Class Files.

* cited by examiner

COMPENSATION OF ORGAN DEFORMATION FOR MEDICAL IMAGE REGISTRATION

CROSS-REFERENCE TO RELATED APPLICATIONS

This application is a national phase filing under 35 U.S.C. § 371 of International Patent Application No. PCT/US2019/066141, filed Dec. 13, 2019, the disclosure of which is incorporated herein by reference in its entirety.

TECHNICAL FIELD

The present invention relates generally to medical image registration, and more particularly to the compensation of organ deformation for medical image registration.

BACKGROUND

Registration of medical images is the basis for many medical imaging analysis tasks. However, registration of medical images may be heavily influenced by motion patterns of a patient, such as, e.g., respiratory or cardiac motion. Such motion patterns of the patient cause various states of deformation of organs and other anatomical objects in the medical images, resulting in misalignment between the medical images, and typically occur in regions of the patient where there is a high need for accurate registration. Conventional registration techniques are often unable to accurately compensate for such deformation. In particular, many convention registration techniques focus on aligning structures with high intensity differences while missing misalignment of structures of low intensity differences.

BRIEF SUMMARY OF THE INVENTION

In accordance with one or more embodiments, systems and methods for medical image registration are provided. A first input medical image and a second input medical image of one or more anatomical objects (e.g., organs) are received. For each respective anatomical object of the one or more anatomical objects, a region of interest comprising the respective anatomical object is detected in one of the first input medical image or the second input medical image, the region of interest is extracted from the first input medical image and from the second input medical image, and a motion distribution of the respective anatomical object is determined from one of the region of interest extracted from the first input medical image or the region of interest extracted from the second input medical image using a motion model specific to the respective anatomical object. The first input medical image and the second input medical image are registered based on the motion distribution of each respective anatomical object of the one or more anatomical objects to generate a fused image.

In one embodiment, the first input medical image and the second input medical image are registered by determining a regularization term for the one or more anatomical objects based on distances between the motion distribution of each respective anatomical object and a prior distribution and minimizing a loss function including the regularization term for the one or more anatomical objects. The regularization term may be determined by summing the distances between the motion distribution of each respective anatomical object and the prior distribution.

In one embodiment, the motion model specific to the respective anatomical object includes a variational autoencoder including an encoder and the motion distribution of the respective anatomical object is determined using the encoder. The machine learning network may be trained by training an encoder of a variational autoencoder to generate a code representing an encoding of deformation between the region of interest extracted from the first training image and the region of interest extracted from the second training image, and training a decoder of the variational autoencoder to generate a deformation field from the code and the region of interest extracted from the first training image, the deformation field representing the deformation between the region of interest extracted from the first training image and the region of interest extracted from the second training image.

In one embodiment, for each respective anatomical object, the motion model specific to the respective anatomical object is learned by receiving a first training image and a second training image of the respective anatomical object, detecting a region of interest comprising the respective anatomical object in the first training image and a region of interest comprising the respective anatomical object in the second training image, extracting the region of interest from the first training image and the second training image, and training a machine learning network to model motion of the respective anatomical object from the region of interest extracted from the first training image and the region of interest extracted from the second training image as the motion model specific to the respective anatomical object.

In one embodiment, the region of interest comprising the respective anatomical object may be detected by segmenting the respective anatomical object in one of the first input medical image or the second input medical image and centering the region of interest around the segmented respective anatomical object.

These and other advantages of the invention will be apparent to those of ordinary skill in the art by reference to the following detailed description and the accompanying drawings.

DETAILED DESCRIPTION

The present invention generally relates to methods and systems for compensation of organ deformation for medical image registration. Embodiments of the present invention are described herein to give a visual understanding of such methods and systems for compensation of organ deformation for medical image registration. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Further, it should be understood that while the embodiments discussed herein may be discussed with respect to compensation of organ deformation for medical image registration, the present invention is not so limited. Embodiments of the present invention may be applied for the registration of images of any type by compensating for deformation or motion of any object of interest.

In medical image registration, the goal is to find a spatial transformation to transform a first image to align with a second image. The first image is typically referred to as the moving image and the second image is typically referred to as the fixed image. Often times, motion such as, e.g., respiratory motion or cardiac motion causes deformations of anatomical objects depicted in the medical images, resulting in inaccuracies in such medical image registration. Certain embodiments of the present invention learn a motion model specific to an anatomical object and use the motion model to determine a regularization term for the anatomical object for medical image registration, thereby compensating for deformation or other motion of the anatomical object. Advantageously, the regularization term provides for medical image registration with a high degree of accuracy.

Figure 1:
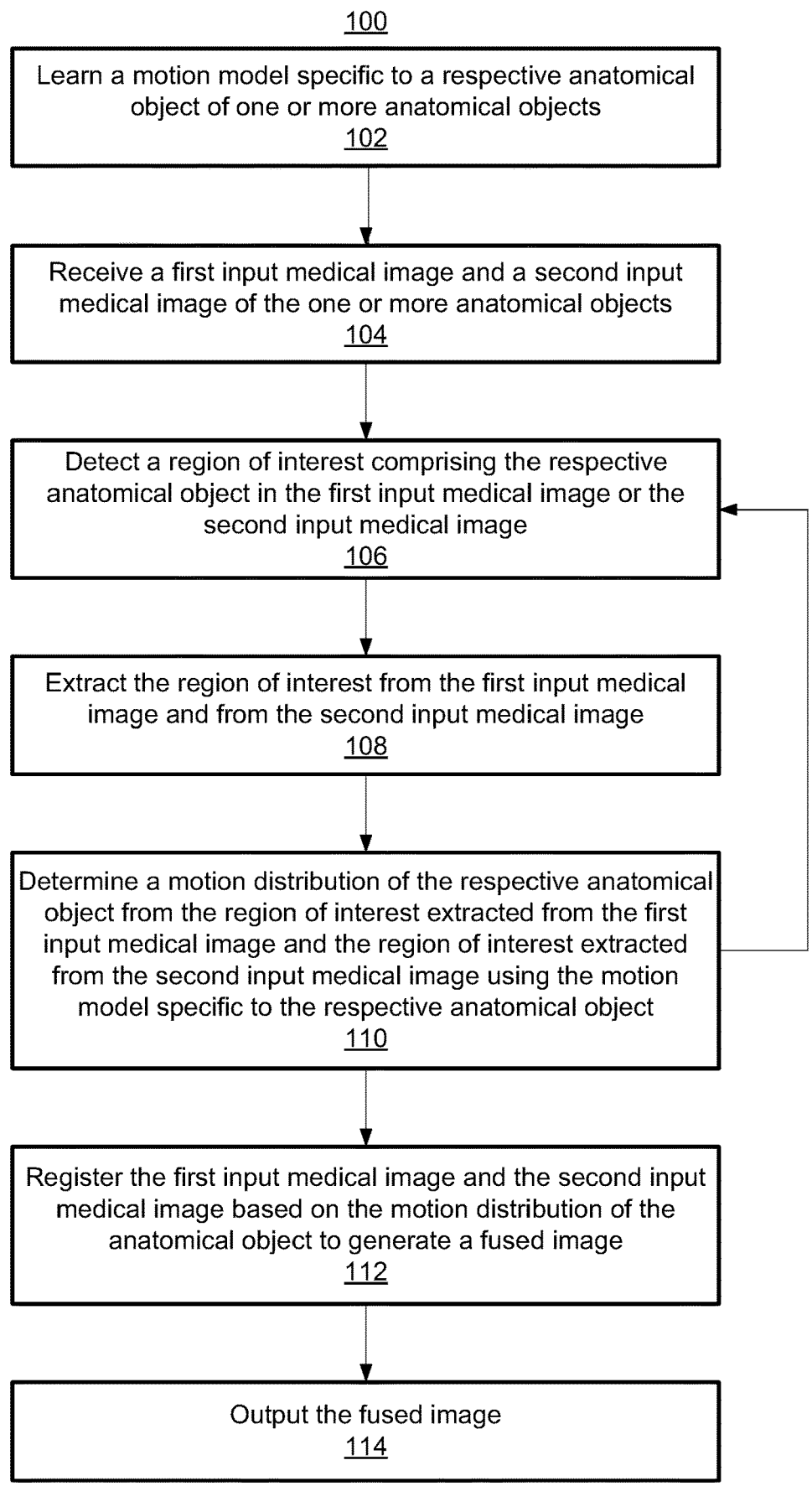
FIG. 1 shows a method for medical image registration, in accordance with one or more embodiments.

FIG. 1 shows a method 100 for medical image registration, in accordance with one or more embodiment. Method 100 may be performed using any suitable computing device, such as, e.g., computer 402 of FIG. 4.

At step 102, a motion model specific to a respective anatomical object of one or more anatomical objects is learned. Step 102 may be performed during an offline or preprocessing stage. In one embodiment, the motion model specific to the respective anatomical object is learned by performing the steps of method 200 of FIG. 2.

Figure 2:
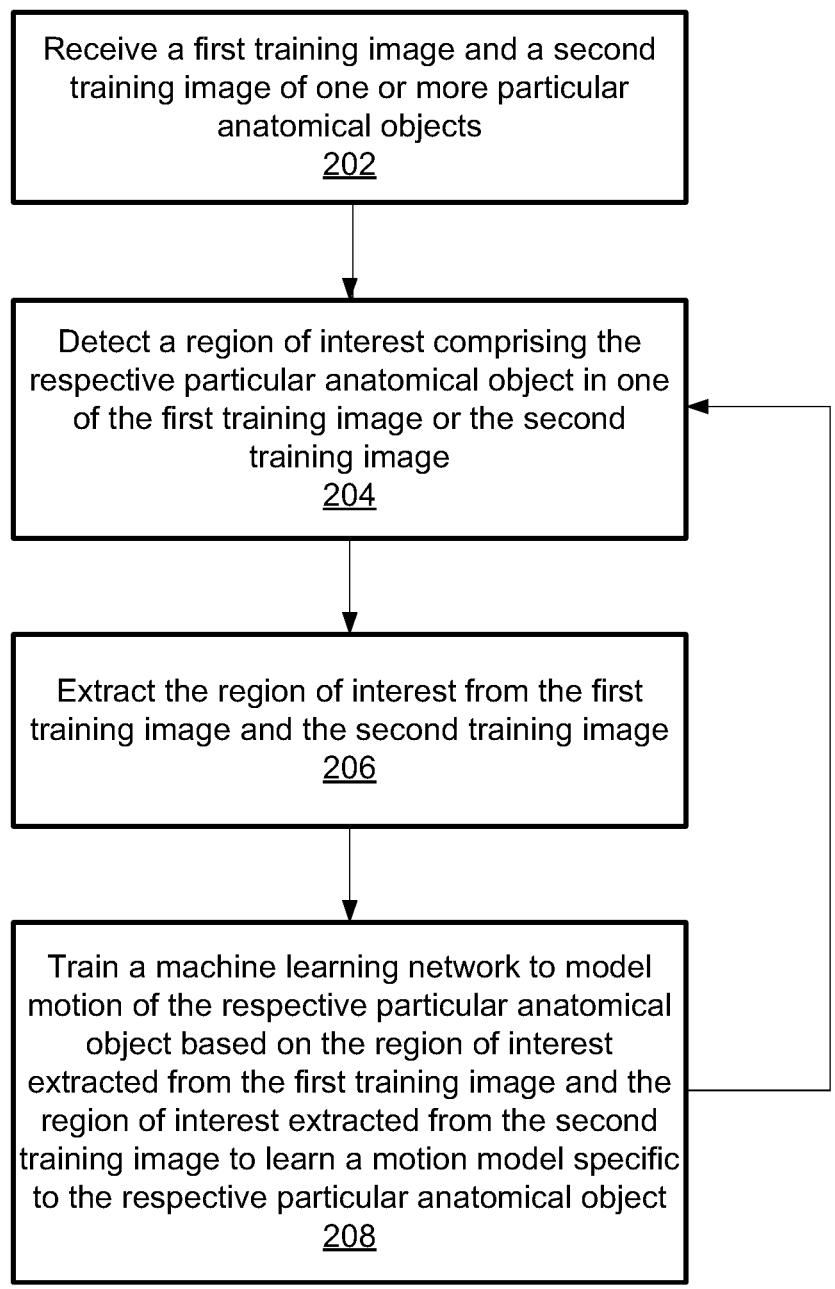
FIG. 2 shows a method for learning a motion model specific to an anatomical object, in accordance with one or more embodiments.

Referring to FIG. 2, a method 200 for learning a motion model specific to an anatomical object is shown, in accordance with one or more embodiments. Method 200 may be performed by any suitable computing device, such as, e.g., computer 402 of FIG. 4.

At step 202, a first training image and a second training image of one or more particular anatomical objects are received. The first training image may correspond to a moving image denoted $I_0$ and the second training image may correspond to a fixed image denoted $I_1$. The first training image $I_0$ and second training image $I_1$ depict the same one or more particular anatomical objects in various states of deformation due to, e.g., respiratory motion or cardiac motion. In one embodiment, the first training image $I_0$ and second training image $I_1$ are of a sequence of images acquired over a period of time. The one or more anatomical objects may include any anatomical structure of a patient, such as, e.g., an organ (e.g., lung, heart, liver, kidney, bladder, etc.), a vessel, a bone, etc.

In one embodiment, the first training image $I_0$ and second training image $I_1$ are of the same modality. The first training image $I_0$ and second training image $I_1$ may be of any suitable modality, such as, e.g., x-ray, magnetic resonance imaging (MRI), computed tomography (CT), ultrasound (US), single-photon emission computed tomography (SPECT), positron emission tomography (PET), or any other suitable modality or combination of modalities. The first training image $I_0$ and second training image $I_1$ may be received directly from an image acquisition device (e.g., image acquisition device 414 of FIG. 4) used to acquire the images. Alternatively, the first training image $I_0$ and second training image $I_1$ may be received by loading previously acquired images from a storage or memory of a computer system (e.g., a picture archiving and communication system, PACS) or receiving images that have been transmitted from a remote computer system. It should be understood that while method 200 is described with respect to a first training image $I_0$ and a second training image $I_1$, method 200 may be performed using any plurality of training images.

At step 204, for a respective particular anatomical object of the one or more particular anatomical objects, a region of interest comprising the respective particular anatomical object is detected in one of the first training image $I_0$ or the second training image $I_1$. The region of interest may be detected manually via input from a user (e.g., a clinician) or automatically using any suitable known technique. In one embodiment, the respective particular anatomical object is segmented from the training image according to a selective and iterative method for performance level estimation (SIMPLE) method and the region of interest is centered around the segmented respective particular anatomical object.

At step 206, the region of interest comprising the respective particular anatomical object is extracted from the first training image and the second training image.

At step 208, a machine learning network is trained to model motion of the respective particular anatomical object based on the region of interest extracted from the first training image and the region of interest extracted from the second training image to learn a motion model specific to the respective particular anatomical object. The machine learning network may be any suitable machine learning for modeling motion of the anatomical object. In one embodiment, the machine learning network is a variational autoencoder (VAE), such as, e.g., VAE 300 shown in FIG. 3, to provide for a probabilistic motion model specific to the respective particular anatomical object, in accordance with one or more embodiments.

Figure 3:
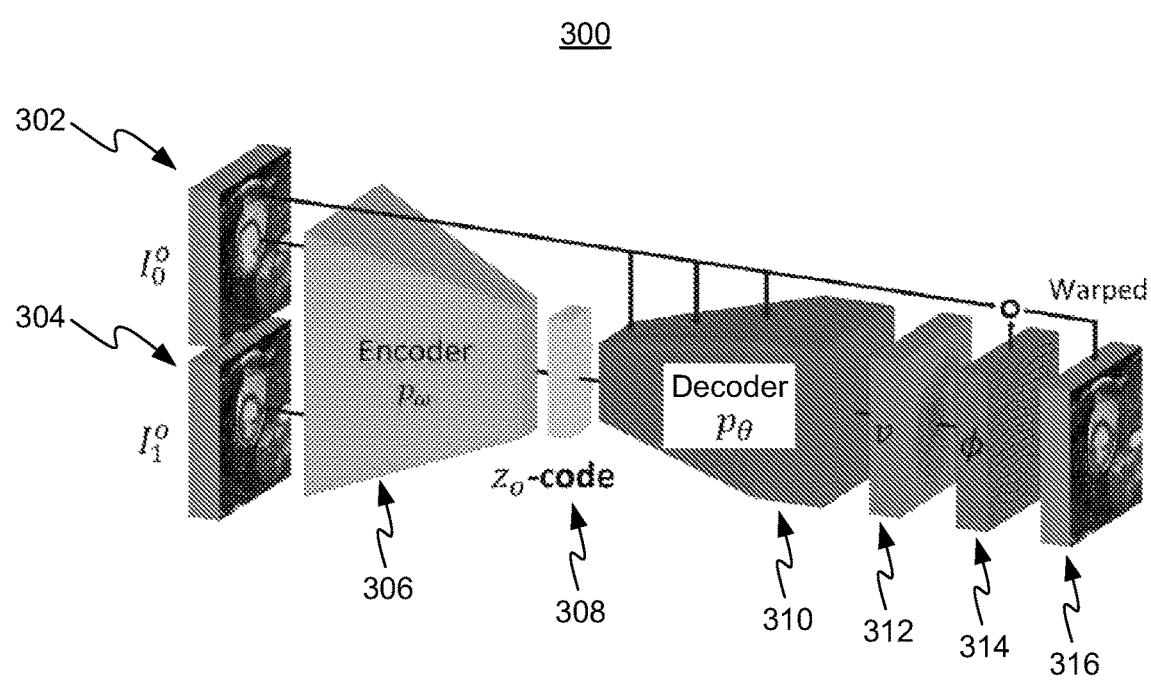
FIG. 3 shows an exemplary variational autoencoder, in accordance with one or more embodiments.

VAE 300 includes an encoder $p_\omega$ 306 and a decoder $p_\theta$ 310. Encoder $p_\omega$ 306 is a neural network that receives as input sub-images $I_0^o$ 302 and $I_1^o$ 304 and outputs code $z_0$ 308. Sub-images $I_0^o$ 302 and $I_1^o$ 304 are the regions of interest o extracted from the first training image $I_0$ and the second training image $I_1$ respectively. Code $z_0$ 308 is a low-dimensional vector representing the mean and variance of the multivariate Gaussian sampled from the first training image $I_0$ and the second training image $I_1$ by encoder $p_\omega$ 306. Decoder $p_\theta$ 310 is a neural network that receives as input sub-image $I_0^o$ 302 and code $z_0$ 308 and outputs velocities v 312 and deformation field $\phi$ 314. Velocities v 312 are raw outputs of VAE 300 and are non-diffeomorphic. Velocities v 312 comprise the velocity value for each pixel. Deformation field $\phi$ 314 is computed by exponentiation and represents the deformation between sub-images $I_0^o$ 302 and $I_1^o$ 304. By making appearance information of the moving sub-image $I_0^o$ 302 available to decoder $p_\theta$ 310, deformation field $\phi$ 314 is more likely to encode deformation information rather than appearance information. As shown in FIG. 3, deformation field $\phi$ 314 is applied to sub-image $I_0^o$ 302 to reconstruct sub-image $I_1^o$ 304. VAE 300 is trained according to Equation 1 to optimize code $z_0$ 308 to best transform sub-image $I_0^o$ 302 to align with sub-image $I_1^o$ 304.

$$p_\theta(I_1^o, I_0^o) = \int_{z_0} p_\theta(I_1^o | z_0, I_0^o) p(z_0) dz \qquad \text{(Equation 1)}$$

where $p(z_0)$ is a prior distribution of $z_0$ and is assumed to follow a multivariate unit Gaussian distribution. Prior distribution $p(z_0)$ refers to the distribution learned by VAE 300 representing the distribution of all probable motions of the respective particular anatomical object (as observed in a training set).

It should be understood that method 200 may return to step 204 and steps 204-208 may be iteratively repeated to learn a motion model specific to each particular anatomical object of the one or more particular anatomical objects.

Referring back to FIG. 1, at step 104, a first input medical image and a second input medical image of the one or more anatomical objects are received. The first input medical image may correspond to a moving image M and the second input medical image may correspond to a fixed image F of a dataset to be registered. The first input medical image M and the second input medical image F depict the same one or more anatomical objects in various states of deformation due to, e.g., respiratory motion or cardiac motion. In one embodiment, the first input medical image M and the second input medical image F are of a sequence of images acquired over a period of time. The first input medical image M and the second input medical image F may be of any suitable modality.

The first input medical image M and the second input medical image F may be received directly from an image acquisition device (e.g., image acquisition device 414 of FIG. 4) used to acquire the images. Alternatively, the first input medical image M and the second input medical image F may be received by loading previously acquired images from a storage or memory of a computer system (e.g., a picture archiving and communication system, PACS) or receiving images that have been transmitted from a remote computer system.

At step 106, for each respective anatomical object, a region of interest o comprising the respective anatomical object is detected in one of the first input medical image M or the second input medical image F. The region of interest o may be detected manually via input from a user (e.g., a clinician) or automatically using any suitable known technique. In one embodiment, the region of interest may be automatically by segmenting the respective anatomical object from the first input medical image M or the second input medical image F and centering the region of interest around the segmented respective anatomical object, as described above with respect to step 204 of method 200 in FIG. 2.

At step 108, the region of interest is extracted from the first input medical image and from the second input medical image.

At step 110, a motion distribution of the respective anatomical object is determined from the region of interest extracted from the first input medical image M and the region of interest extracted from the second input medical image F using the motion model specific to the respective anatomical object (learned at step 102). In one embodiment, where the motion model is a VAE, a trained encoder $p_\omega$ (e.g., encoder $p_\omega$ 306 of FIG. 3) of the motion model is applied on the region of interest extracted from the first input medical image M and the region of interest extracted from the second input medical image F according to the function $p_\omega(M^o, M^o \circ \phi_\theta)$ to determine the motion distribution $z_0$ of the respective anatomical object. In particular, the encoder $p_\omega$ receives as input the region of interest extracted from the first input medical image M and the region of interest extracted from the first input medical image M as modified by the deformation field $\phi_\theta$ and outputs the motion distribution $z_0$. Deformation field $\phi_\theta$ represents the global motion between the first input medical image M and the second input medical image F. Advantageously, computing motion distribution $z_0$ on the same image (e.g., the first input medical image M) enables multi-modality registration with training of the motion model specific to the respective anatomical object on only one of the modalities. It should be understood that motion distribution $z_0$ may instead be determined according to $p_\omega(F^o, F^o \circ \phi_\theta)$ by inverting the resulting motion distribution $z_0$ where $p_{107}$ is trained using the fixed image.

The distance between the motion distribution $z_0 = p_\omega(M_0, M^o \circ \phi_\theta)$ and the prior distribution $p(z_0)$ is then minimized by varying training weights $\theta$ of the network at each iteration. Minimizing the distance between motion distribution $z_0$ and prior distribution $p(z_0)$ ensures that motion distribution $z_0$ is a probable motion for the respective anatomical object. In one embodiment, the distance is a Kullback-Leibler Divergence. However, other distance metrics $\mathcal{D}$ may be applied, such as, e.g., optimal transport loss, generative adversarial networks, adversarial autoencoders, or any other suitable distance metric.

Method 100 may return back to step 106 and steps 106-110 may be iteratively repeated for each respective anatomical object of the one or more anatomical objects (e.g., for whole body registration) to thereby determine a motion distribution of each of the one or more anatomical objects.

At step 112, the first input medical image and the second input medical image are registered based on the motion distribution of each respective anatomical object of the one or more anatomical objects to generate a fused image.

In one embodiment, an anatomical object-specific regularization term $\mathcal{R}_{object}(\phi)$ is determined as the summation of the distances between the motion distribution $z_0 = p_{\omega(M}^{\ o}, M^o \circ \phi_\theta)$ for each respective anatomical object and the prior distribution $p(z_0)$, as shown in Equation 2:

$$\mathcal{R}_{object}(\phi) = \Sigma_{o \in O} \mathcal{D}(p_\omega(M_0^o, M_0^o \circ \phi_\theta) \| p(z_0)) \quad \text{(Equation 2)}$$

where o is the region of interest for a respective anatomical object, $\mathcal{D}$ is a distance metric (e.g., Kullback-Leibler Divergence), $M_0^o$ is the region of interest o extracted from the first input medical image M, $\phi_\theta$ is the global motion between the first input medical image M and the second input medical image F, and $p(z_0)$ is the prior distribution. The first input medical image and the second input medical image are then registered according to the loss function of Equation 3:

$$\operatorname{argmin}_\theta \mathcal{D}(F, M \circ \phi_\theta) + \lambda_1 \mathcal{R}_{spatial}(\phi_\theta) + \lambda_2 \mathcal{R}_{object}(\phi_\theta) \quad \text{(Equation 3)}$$

where $\mathcal{D}$ is a distance metric (e.g., Kullback-Leibler Divergence), F is the second input medical image, M is the first input medical image, $\phi_\theta$ is the divergence field of the motion model, $\mathcal{R}_{spatial}(\phi_\theta)$ is a spatial regularization term, $\mathcal{R}_{object}(\phi_\theta)$ is a regularization term for the one or more anatomical objects defined in Equation 2, and $\lambda_1$ and $\lambda_2$ are parameters that weight $\mathcal{R}(\phi_\theta)$ and $\mathcal{R}_{object}(\phi_\theta)$ respectively. The loss function of Equation 3 includes the regularization term for the one or more anatomical objects and therefore may be used to compensate for organ deformation to train a machine learning network to register the first input medical image and the second input medical image to generate the fused image.

At step 114, the fused image is output. For example, the fused image can be output by displaying the fused image on a display device of a computer system, storing the fused image on a memory or storage of a computer system, or by transmitting the fused image to a remote computer system.

Advantageously, embodiments of the present invention provide for an anatomical object-specific regularization term $\mathcal{R}_{object}(\phi_\theta)$ for medical image registration to focus the registration process on regions of interest and compensate for motion of anatomical objects in the regions of interest. Embodiments of the present invention are not as computationally expensive to perform as convention techniques that require segmentation of anatomical objects in both images, as certain embodiments of the present invention involve detecting a bounding box in one of the input medical images. Embodiments of the present invention allow for medical image registration with a high degree of accuracy.

In some embodiments, instead of the prior distribution $p(z_0)$, a mean posterior distribution $\bar{p}_\omega(.,.)$ may be used. The mean posterior distribution $\bar{p}_\omega(.,.)$ may be extracted after learning the motion models for each anatomical object.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 1-2. Certain steps or functions of the methods and workflows described herein, including one or more of the steps or functions of FIGS. 1-2, may be performed by a server or by another processor in a network-based cloud-computing system. Certain steps or functions of the methods and workflows described herein, including one or more of the steps of FIGS. 1-2, may be performed by a client computer in a network-based cloud computing system. The steps or functions of the methods and workflows described herein, including one or more of the steps of FIGS. 1-2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 1-2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 4:
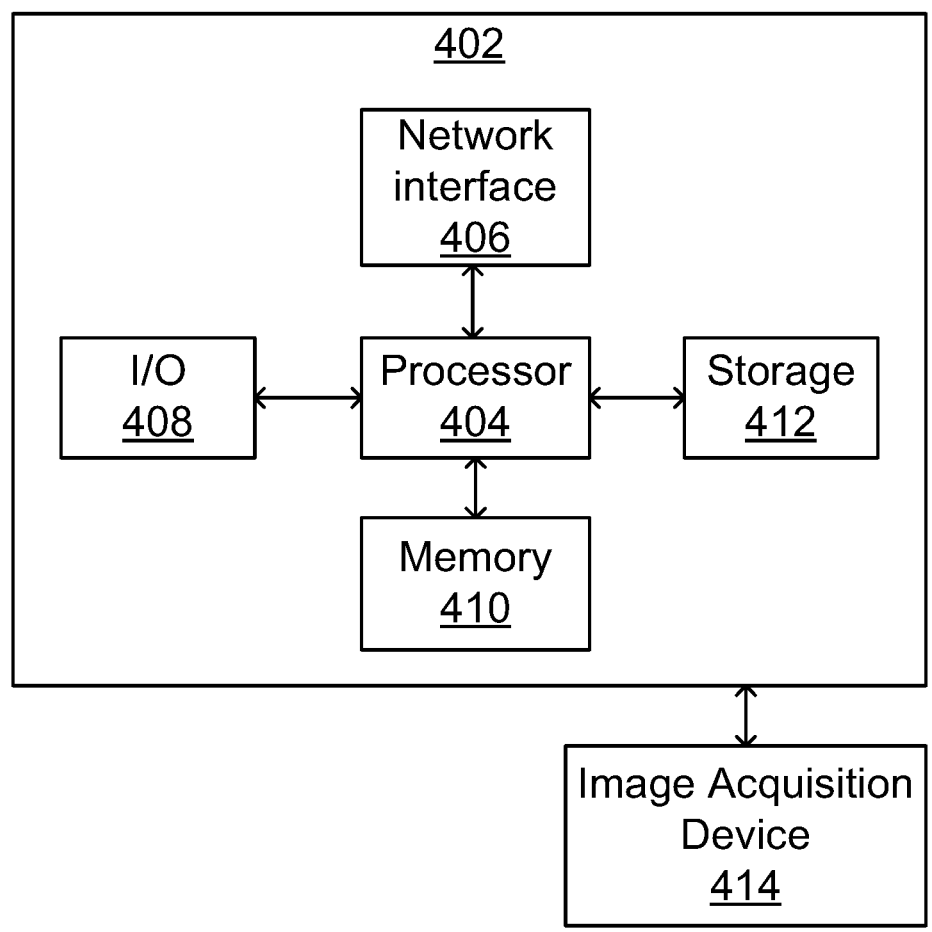
FIG. 4 shows a high-level block diagram of a computer.

A high-level block diagram of an example computer 402 that may be used to implement systems, apparatus, and methods described herein is depicted in FIG. 4. Computer 402 includes a processor 404 operatively coupled to a data storage device 412 and a memory 410. Processor 404 controls the overall operation of computer 402 by executing computer program instructions that define such operations. The computer program instructions may be stored in data storage device 412, or other computer readable medium, and loaded into memory 410 when execution of the computer program instructions is desired. Thus, the method and workflow steps or functions of FIGS. 1-2 can be defined by the computer program instructions stored in memory 410 and/or data storage device 412 and controlled by processor 404 executing the computer program instructions. For example, the computer program instructions can be implemented as computer executable code programmed by one skilled in the art to perform the method and workflow steps or functions of FIGS. 1-2. Accordingly, by executing the computer program instructions, the processor 404 executes the method and workflow steps or functions of FIGS. 1-2. Computer 402 may also include one or more network interfaces 406 for communicating with other devices via a network. Computer 402 may also include one or more input/output devices 408 that enable user interaction with computer 402 (e.g., display, keyboard, mouse, speakers, buttons, etc.).

Processor 404 may include both general and special purpose microprocessors, and may be the sole processor or one of multiple processors of computer 402. Processor 404 may include one or more central processing units (CPUs), for example. Processor 404, data storage device 412, and/or memory 410 may include, be supplemented by, or incorporated in, one or more application-specific integrated circuits (ASICs) and/or one or more field programmable gate arrays (FPGAs).

Data storage device 412 and memory 410 each include a tangible non-transitory computer readable storage medium. Data storage device 412, and memory 410, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 408 may include peripherals, such as a printer, scanner, display screen, etc. For example, input/ output devices 408 may include a display device such as a cathode ray tube (CRT) or liquid crystal display (LCD) monitor for displaying information to the user, a keyboard, and a pointing device such as a mouse or a trackball by which the user can provide input to computer 402.

An image acquisition device 414 can be connected to the computer 402 to input image data (e.g., medical images) to the computer 402. It is possible to implement the image acquisition device 414 and the computer 402 as one device. It is also possible that the image acquisition device 414 and the computer 402 communicate wirelessly through a network. In a possible embodiment, the computer 402 can be located remotely with respect to the image acquisition device 414.

Any or all of the systems and apparatus discussed herein may be implemented using one or more computers such as computer 402.

One skilled in the art will recognize that an implementation of an actual computer or computer system may have other structures and may contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method, comprising:
receiving a first input medical image and a second input medical image of one or more anatomical objects;
for each respective anatomical object of the one or more anatomical objects:
detecting a region of interest comprising the respective anatomical object in one of the first input medical image or the second input medical image,
extracting the region of interest from the first input medical image and from the second input medical image, and
determining a motion distribution of the respective anatomical object from the region of interest extracted from one of the first input medical image or the region of interest extracted from the second input medical image using a motion model specific to the respective anatomical object; and
registering the first input medical image and the second input medical image based on the motion distribution of each respective anatomical object of the one or more anatomical objects.

2. The method of claim 1, wherein registering the first input medical image and the second input medical image based on the motion distribution of each respective anatomical object of the one or more anatomical objects comprises:
determining a regularization term for the one or more anatomical objects based on distances between the motion distribution of each respective anatomical object and a prior distribution.

3. The method of claim 2, wherein determining a regularization term for the one or more anatomical objects based on distances between the motion distribution of each respective anatomical object and a prior distribution comprises:
summing the distances between the motion distribution of each respective anatomical object and the prior distribution.

4. The method of claim 2, wherein registering the first input medical image and the second input medical image based on the motion distribution of each respective anatomical object of the one or more anatomical objects comprises:
minimizing a loss function including the regularization term for the one or more anatomical objects.

5. The method of claim 1, wherein the motion model specific to the respective anatomical object comprises a variational autoencoder comprising an encoder, and wherein determining a motion distribution of the respective anatomical object from one of the region of interest extracted from the first input medical image or the region of interest extracted from the second input medical image using a motion model specific to the respective anatomical object comprises:
determining the motion distribution of the respective anatomical object using the encoder.

6. The method of claim 1, further comprising, for each respective anatomical object, learning the motion model specific to the respective anatomical object by:
receiving a first training image and a second training image of the respective anatomical object;
detecting a region of interest comprising the respective anatomical object in one of the first training image or the second training image;
extracting the region of interest from the first training image and the second training image; and
training a machine learning network to model motion of the respective anatomical object from the region of interest extracted from the first training image and the region of interest extracted from the second training image as the motion model specific to the respective anatomical object.

7. The method of claim 6, wherein training a machine learning network to model motion of the respective anatomical object from the region of interest extracted from the first training image and the region of interest extracted from the second training image as the motion model specific to the respective anatomical object comprises:
training an encoder of a variational autoencoder to generate a code representing an encoding of deformation between the region of interest extracted from the first training image and the region of interest extracted from the second training image; and
training a decoder of the variational autoencoder to generate a deformation field from the code and the region of interest extracted from the first training image, the deformation field representing the deformation between the region of interest extracted from the first training image and the region of interest extracted from the second training image.

8. The method of claim 1, wherein detecting a region of interest comprising the respective anatomical object in one of the first input medical image or the second input medical image comprises:
segmenting the respective anatomical object in one of the first input medical image or the second input medical image; and
centering the region of interest around the segmented respective anatomical object.

9. The method of claim 1, wherein the one or more anatomical objects comprises one or more organs.

10. An apparatus, comprising:
- means for receiving a first input medical image and a second input medical image of one or more anatomical objects;
- means for, for each respective anatomical object of the one or more anatomical objects, detecting a region of interest comprising the respective anatomical object in one of the first input medical image or the second input medical image;
- means for, for each respective anatomical object, extracting the region of interest from the first input medical image and from the second input medical image;
- means for, for each respective anatomical object, determining a motion distribution of the respective anatomical object from the region of interest extracted from one of the first input medical image or the region of interest extracted from the second input medical image using a motion model specific to the respective anatomical object; and
- means for registering the first input medical image and the second input medical image based on the motion distribution of each respective anatomical object of the one or more anatomical objects.

11. The apparatus of claim 10, wherein the means for registering the first input medical image and the second input medical image based on the motion distribution of each respective anatomical object of the one or more anatomical objects comprises:
- means for determining a regularization term for the one or more anatomical objects based on distances between the motion distribution of each respective anatomical object and a prior distribution.

12. The apparatus of claim 11, wherein the means for determining a regularization term for the one or more anatomical objects based on distances between the motion distribution of each respective anatomical object and a prior distribution comprises:
- means for summing the distances between the motion distribution of each respective anatomical object and the prior distribution.

13. The apparatus of claim 11, wherein the means for registering the first input medical image and the second input medical image based on the motion distribution of each respective anatomical object of the one or more anatomical objects comprises:
- means for minimizing a loss function including the regularization term for the one or more anatomical objects.

14. The apparatus of claim 10, wherein the motion model specific to the respective anatomical object comprises a variational autoencoder comprising an encoder, and wherein the means for determining a motion distribution of the respective anatomical object from the region of interest extracted from one of the first input medical image or the region of interest extracted from the second input medical image using a motion model specific to the respective anatomical object comprises:
- means for determining the motion distribution of the respective anatomical object using the encoder.

15. A non-transitory computer readable medium storing computer program instructions, the computer program instructions when executed by a processor cause the processor to perform operations comprising:
- receiving a first input medical image and a second input medical image of one or more anatomical objects;
- for each respective anatomical object of the one or more anatomical objects:
  - detecting a region of interest comprising the respective anatomical object in one of the first input medical image or the second input medical image,
  - extracting the region of interest from the first input medical image and from the second input medical image, and
  - determining a motion distribution of the respective anatomical object from the region of interest extracted from one of the first input medical image or the region of interest extracted from the second input medical image using a motion model specific to the respective anatomical object; and
- registering the first input medical image and the second input medical image based on the motion distribution of each respective anatomical object of the one or more anatomical objects.

16. The non-transitory computer readable medium of claim 15, wherein registering the first input medical image and the second input medical image based on the motion distribution of each respective anatomical object of the one or more anatomical objects comprises:
- determining a regularization term for the one or more anatomical objects based on distances between the motion distribution of each respective anatomical object and a prior distribution.

17. The non-transitory computer readable medium of claim 16, wherein registering the first input medical image and the second input medical image based on the motion distribution of each respective anatomical object of the one or more anatomical objects comprises:
- minimizing a loss function including the regularization term for the one or more anatomical objects.

18. The non-transitory computer readable medium of claim 15, further comprising, for each respective anatomical object, learning the motion model specific to the respective anatomical object by:
- receiving a first training image and a second training image of the respective anatomical object;
- detecting a region of interest comprising the respective anatomical object in one of the first training image or the second training image;
- extracting the region of interest from the first training image and the second training image; and
- training a machine learning network to model motion of the respective anatomical object from the region of interest extracted from the first training image and the region of interest extracted from the second training image as the motion model specific to the respective anatomical object.

19. The non-transitory computer readable medium of claim 18, wherein training a machine learning network to model motion of the respective anatomical object from the region of interest extracted from the first training image and the region of interest extracted from the second training image as the motion model specific to the respective anatomical object comprises:
- training an encoder of a variational autoencoder to generate a code representing an encoding of deformation between the region of interest extracted from the first training image and the region of interest extracted from the second training image; and
- training a decoder of the variational autoencoder to generate a deformation field from the code and the region of interest extracted from the first training image, the deformation field representing the deformation between the region of interest extracted from the first training image and the region of interest extracted from the second training image.

20. The non-transitory computer readable medium of claim 15, wherein detecting a region of interest comprising the respective anatomical object in one of the first input medical image or the second input medical image comprises:
- segmenting the respective anatomical object in one of the first input medical image or the second input medical image; and
- centering the region of interest around the segmented respective anatomical object.

\* \* \* \* \*